No. 752,155. PATENTED FEB. 16, 1904.
G. HACKER.
WATER SUPPLY APPARATUS FOR CATTLE, POULTRY, &c.
APPLICATION FILED MAY 25, 1903. RENEWED DEC. 26, 1903.
NO MODEL. 2 SHEETS—SHEET 1.
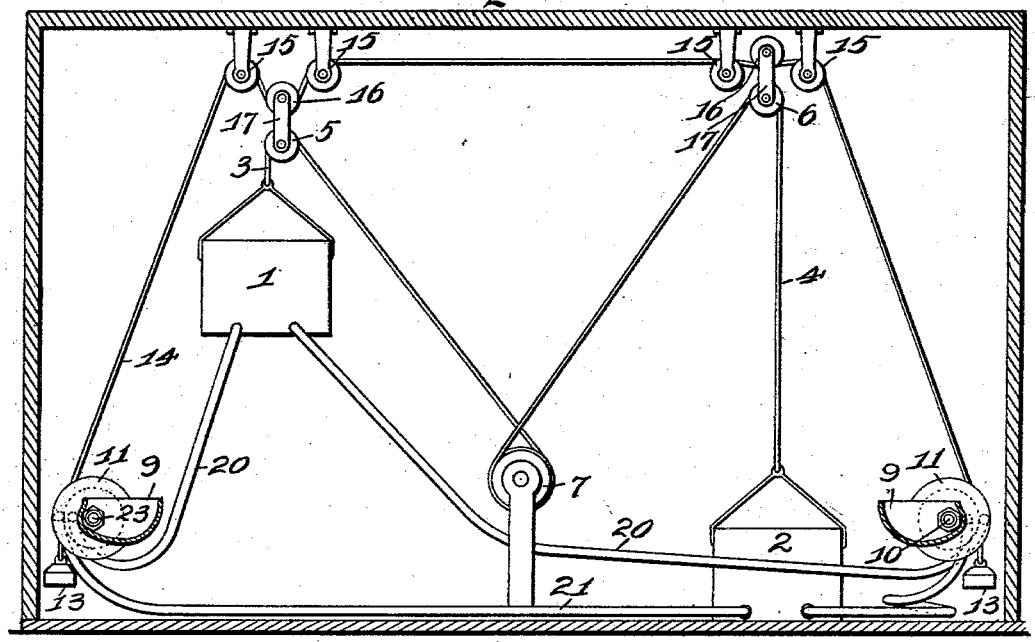
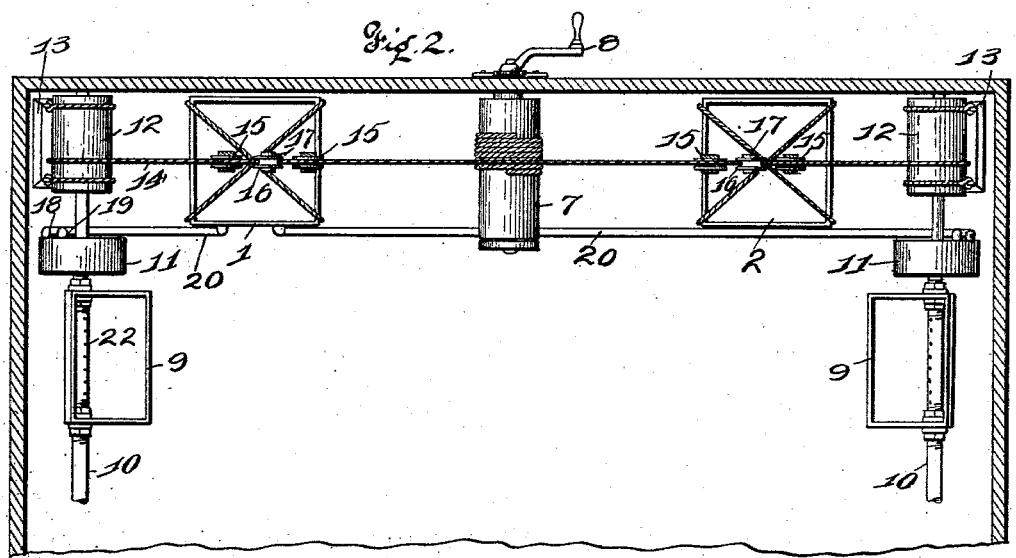
Witnesses
Inventor.
George Hacker
by Higdon & Longan & Hopkins attys No. 752,155. PATENTED FEB. 16, 1904.
G. HACKER.
WATER SUPPLY APPARATUS FOR CATTLE, POULTRY, &c.
APPLICATION FILED MAY 25, 1903. RENEWED DEC. 26, 1903.
NO MODEL. 2 SHEETS—SHEET 2.
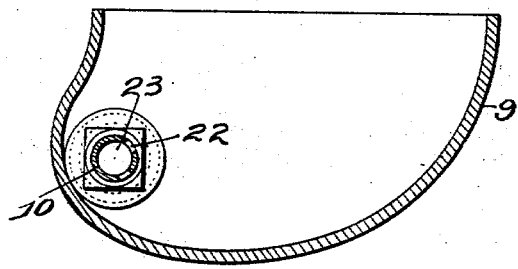
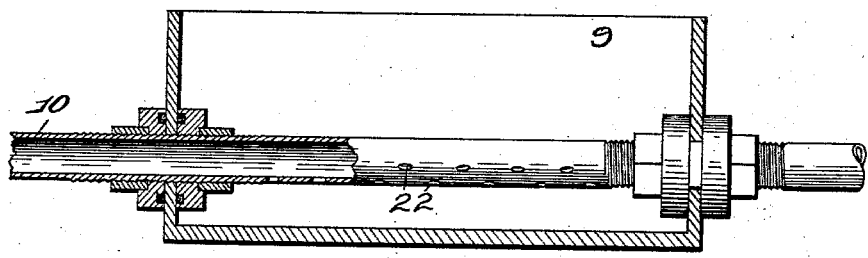
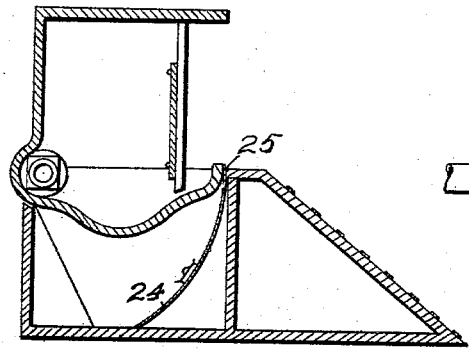
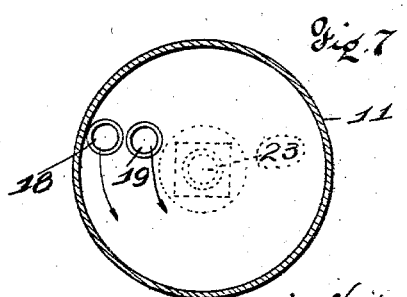

No. 752,155. Patented February 16, 1904.

UNITED STATES PATENT OFFICE.

GEORGE HACKER, OF ST. LOUIS, MISSOURI.

WATER-SUPPLY APPARATUS FOR CATTLE, POULTRY, &c.

SPECIFICATION forming part of Letters Patent No. 752,155, dated February 16, 1904.

Application filed May 25, 1903. Renewed December 26, 1903. Serial No. 186,707. (No model.)

*To all whom it may concern:*

Be it known that I, GEORGE HACKER, a citizen of the United States, residing at St. Louis, State of Missouri, have invented certain new and useful Improvements in Water-Supply Apparatus for Cattle, Poultry, and the Like, of which the following is a specification containing a full, clear, and exact description, reference being had to the accompanying drawings, forming a part hereof.

My invention relates to improvements in water-supply apparatus for cattle, poultry, and the like, and has for its object to provide means whereby a constant supply of fresh running water may be fed to and delivered from a series of drinking-fountains.

The hereinafter-described invention is primarily intended for auxiliary use with the watering apparatus for poultry-houses wherefor Letters Patent of the United States have heretofore been allowed to me under my application, Serial No. 139,232, filed January 15, 1903, such allowance having been made upon the 27th day of April, 1903; but my present invention is also adapted for use in connection with water-supply for stock-cars, stock-pens, and in any other situation in which it is desired to furnish horses, cattle, or other live stock or poultry with a constant supply of clean running water.

In the drawings, Figure 1 is a side view of the water-supply tanks of my invention and their connections, showing two of the drinking-fountains in section. Fig. 2 is a top view of the same. Fig. 3 is a transverse mid-section of one of the drinking-fountains. Fig. 4 is a longitudinal vertical section of one of my drinking-fountains. Fig. 5 is a transverse vertical section showing one of the drinking-fountains of my invention in place in connection with the run employed when my system is used in connection with watering poultry. Fig. 6 is a front view of such fountain and run. Fig. 7 is a transverse mid-section of one of the drums employed.

Referring to the drawings, the water-supply tanks are indicated by the numerals 1 and 2. These water-supply tanks are provided with handles and are suspended by means of ropes 3 and 4, passing over pulleys 5 and 6 to the roller 7, which is provided with the crank 8, whereby the roller 7 is revolved to raise and lower the supply-tanks 1 and 2, the adjustment of the ropes 3 and 4 being such that one supply-tank is raised while the other is lowered to or near the level of the floor of the building or car in which my water system is installed.

Two series of drinking-fountains 9 are mounted at the opposite sides of the car or building in which the system is installed, being mounted upon pipes 10. The pipes 10 extend through the drums 11 and are provided with rollers 12. The rollers 12 are provided with counterbalancing-weights 13 and are connected together by means of the rope 14, passing over pulleys 15 and under pulleys 16, the pulleys 16 being connected to the pulleys 5 and 6 by means of the straps 17. The drums 11 are provided with openings 18 and 19, and each of said drums 11 is provided with flexible pipe connections 20 and 21, whereby each of said drums 11 is connected to both of the supply-tanks 1 and 2. In my former invention, on which my present invention is an improvement, the drinking-fountains are arranged at successively lower levels with relation to their vicinity to the supply-tank, no provision being made for the return of water which has once flowed through the tank to the supply-tank. In order to utilize the water which has once flowed into the drinking-fountains and to return the same automatically to a supply-tank, I have devised the means which I have heretofore briefly described and whose mode of operation is as follows: When the tanks 1 and 2 are in the relative positions shown in Fig. 1, the tank 1 is acting as a supply-tank and the tank 2 is acting as the receiving-tank. The pipes 10 are level and the fountains 9 and drums 11 rigidly mounted thereon. The fountains 9 are of the form shown in section in Fig. 1, 3, and 5 and receive the water from the supply-pipes 10 through the perforations 22. The counterbalancing-weights 13 are of such weight as to hold the fountains 9 in vertical position when the rope 14 is not pulled downwardly by the weight of the tank 1 or 2, which is elevated and filled or partially filled with water, or, in other words, the weight is sufficient to counterbalance the weight of either of the tanks 1 and 2 when empty. When the tanks 1 and 2 are in the relative positions indicated in Fig. 1, the tank 1 is carrying the load of water which is to be distributed and the weight of that load is pulling the pulley 16 downwardly, thus producing a vertical pull upon the ropes 14 and holding the fountains 9 in the horizontal position shown in Fig. 1. In Fig. 1 the longitudinal opening of the pipe 10 is indicated by the numeral 23. The openings 18 and 19 of the drums 11 are when the fountains 9 are in a horizontal position situated in a plane above the plane of the opening 23, as indicated in section in Fig. 7. The fountains 9 when the tanks 1 and 2 are in the relative positions shown in Fig. 1 are successively filled to a point at or slightly above the plane of the tops of the pipes 10, the capacity of the tank 1 being such as to provide sufficient water to fill all of the fountains 9 to such level and no more. When the supply is being thus produced, the weight of the tank 1 is gradually decreased by the weight of the water flowing therefrom, and the downward pull upon the pulleys 16 is gradually lessened. As such downward pull is lessening the weight of the weights 13 gradually pulls the rollers 12 and their attachments outwardly and downwardly, causing the drums 11 to revolve outwardly and bringing the openings 18 and 19 downwardly and below the level of the opening 23, so that the water from the fountains 9 is discharged through the perforations 22 into the pipes 10 and through the tubular connections 21 into the tank 2. When this operation has been completed, the tank 1 is empty and the tank 2 full. The roller 7 is then revolved by means of the crank 8, lowering the empty tank 1 and elevating the full tank 2, bringing the load of the tank 2 upon the pulley 6, and pulling the rope 14 downwardly, causing the fountains 9 to again assume their horizontal positon. By this means the water is utilized until it is completely consumed.

When my apparatus is employed in poultry-houses, it is desirable to provide the front of the drinking-fountains with the curved apron 24, which will fit closely to the floor or to runs built upon the floor at the point indicated by the numeral 25, so that as the fountains are revolved and their contents discharged no opening will be offered through which young fowls can get beneath the fountains and be injured when they are returned to the horizontal position.

Having thus described my invention, what I claim as new, and desire to have secured to me by the grant of Letters Patent, is—

1. A water-supply apparatus, consisting of a fountain, a pipe whereon the fountain is mounted, two tanks flexibly connected to the pipe, and means whereby said tanks are alternately raised and lowered to supply the fountain with water and to receive the water discharged from the fountain, substantially as described.

2. In a water-supply apparatus, the combination of a plurality of fountains, a supply-tank flexibly connected to the series of fountains, means whereby the contents of the fountain is emptied as the supply-tank becomes empty, a receiving-tank flexibly connected to the fountain, means whereby the receiving-tank may be elevated above the level of the fountains to become a source of supply, and means whereby the supply-tank may be lowered beneath the level of the fountains to receive the discharge therefrom, substantially as described.

3. A device of the class named, consisting of a series of drinking-fountains, two tanks flexibly connected to the drinking-fountains, and means whereby the tanks may be alternately raised and lowered with reference to the fountains and to each other, so that each becomes successively a supply and a receiving tank, substantially as described.

4. A device of the class named, consisting of a series of drinking-fountains, two tanks flexibly connected to the drinking-fountains, means whereby the tanks may be alternately raised and lowered with reference to the fountains and to each other, so that each becomes successively a supply and a receiving tank, means whereby the weight of the supply-tank is adapted to hold the fountains in position and to release the fountains as the water is discharged from the supply-tank, and means whereby the fountains are revolved to discharge their contents when released by the discharge of the water from the supply-tank, substantially as described.

In testimony whereof I have signed my name to this specification in presence of two subscribing witnesses.

GEORGE HACKER.

Witnesses:
 ALFRED A. EICKS,
 M. G. IRION.